US006079864A

United States Patent [19]

Dean

[11] Patent Number: 6,079,864

[45] Date of Patent: Jun. 27, 2000

[54] HORIZONTAL FLOW GENERATION SYSTEM

[75] Inventor: David D. Dean, Dayton, Ohio

[73] Assignee: Chemineer, Inc., Dayton, Ohio

[21] Appl. No.: 09/146,686

[22] Filed: Sep. 3, 1998

Related U.S. Application Data

[63] Continuation-in-part of application No. 08/726,680, Oct. 7, 1996, Pat. No. 5,803,601.

[51] Int. Cl.[7] ................................ B01F 3/04; B01F 5/12; B01D 45/00

[52] U.S. Cl. .......................... 366/101; 366/102; 366/137; 366/270; 261/93; 210/194; 210/219

[58] Field of Search .................................... 366/101, 107, 366/102, 137, 150.1, 158.5, 159.1, 163.2, 164.1, 164.4, 164.5, 181.5, 182.1, 182.3, 174.1, 241, 244–249, 262–265, 331; 261/119.1, 93, 36.1, 121.1, 124; 210/194, 219, 926, 221.2, 221; 415/208.1, 211.1, 151

[56] References Cited

U.S. PATENT DOCUMENTS

| | | | |
|---|---|---|---|
| 1,716,298 | 6/1929 | Bond | 366/302 |
| 1,754,255 | 4/1930 | Bond | 366/270 |
| 2,229,597 | 1/1941 | Milligan | 366/270 |
| 2,358,679 | 9/1944 | Zacher | 366/182.3 |
| 2,450,107 | 9/1948 | Bostwick | 366/249 |
| 2,452,399 | 10/1948 | Stadler | 366/270 |
| 2,488,773 | 11/1949 | Hansen et al. | 366/265 |
| 2,661,668 | 12/1953 | Gruen | 366/270 |
| 3,263,968 | 8/1966 | Sahlstrom | 366/265 |
| 3,323,782 | 6/1967 | Clough | 366/282 |
| 3,568,694 | 3/1971 | Johnson | 415/151 |
| 4,121,300 | 10/1978 | Coasma et al. | 366/282 |
| 4,290,885 | 9/1981 | Kwak | 261/93 |
| 4,389,158 | 6/1983 | Nakanishi | 415/151 |
| 4,439,045 | 3/1984 | Lew | 366/279 |
| 4,455,232 | 6/1984 | Reid | 261/93 |
| 4,512,895 | 4/1985 | Reid | 261/91 |
| 4,543,185 | 9/1985 | Reid | 261/91 |
| 4,566,971 | 1/1986 | Reimann et al. | 210/616 |
| 4,592,658 | 6/1986 | Claxton | 366/265 |
| 4,722,785 | 2/1988 | Reid | 261/93 |
| 5,046,856 | 9/1991 | McIntire | 366/291 |
| 5,116,506 | 5/1992 | Williamson et al. | 210/610 |
| 5,494,581 | 2/1996 | Hobson | 210/615 |
| 5,538,342 | 7/1996 | Aoshima | 366/279 |

OTHER PUBLICATIONS

ABS Pumps Inc. brochure entitled “RW 13–RW 180 Mixers,” ABS Bulletin, 900.1, Jan., 1992.

Flygt Corporation brochure entitled “Introducing a New Submersible Mixer to Improve Aeration,” Mar., 1986.

Flygt Systems Engineering brochure entitled “Mixers in Biological Treatment Systems,” Aug., 1985.

*Primary Examiner*—Tony G. Soohoo
*Attorney, Agent, or Firm*—Thompson Hine & Flory LLP

[57] ABSTRACT

A fluid mixing system including a liquid mixing device and method for generating and maintaining a substantially uniform, horizontal velocity profile in a liquid circulation system, such as a plug flow reactor, which requires less horsepower than conventional liquid mixing systems without losing mixing effectiveness. The liquid mixing device employs a top-entry, vertically-oriented impeller and a housing that directs the pumped flow in a generally horizontal direction. The liquid mixing module may be positioned in close proximity to an aeration source within a channel.

15 Claims, 11 Drawing Sheets

HORIZONTAL FLOW GENERATION SYSTEM

CROSS-REFERENCE TO RELATED APPLICATIONS

This application is a continuation-in-part of U.S. Ser. No. 08/726,680 filed Oct. 7, 1996 now U.S. Pat. No. 5,803,601.

BACKGROUND OF THE INVENTION

This application is a continuation-in-part of co-pending U.S. application Ser. No. 08/726,680, filed Oct. 7, 1996.

The present invention relates to fluid mixing systems, and more particularly, to a mixing module and method for generating a horizontal fluid flow in a reactor vessel or other flow channel, which vessel or flow channel may include an associated aeration system.

Although horizontal fluid flow is desirable in many fluid mixing systems, the generation of a horizontal fluid flow is especially important in the treatment of water, sewage and like waste liquids in plug flow reactors or oxidation ditches to promote the mixing and agitation of suspended solids. Conventionally, the treatment of water, sewage and like waste liquids in such reactors has utilized multiple side entry or horizontally-oriented turbine agitators. Such agitators require a relatively large amount of horsepower, specific positioning within the reactors and fine adjustments to generate the requisite fluid flow and agitation.

Plug flow reactors have also utilized horizontally-oriented, submersible turbine agitators. Such submersible agitators must be removed from within a plug flow reactor for servicing utilizing various lifting devices. Furthermore, agitators which are entirely submerged require expensive mechanical seals, moisture detectors and housings since the electrical and mechanical components of the agitators are submerged.

In conventional plug flow reactors, the diameter of the impellers on the turbine shafts of the agitators are often limited by the fluid depth of the reactors since the diameter of a side entry or horizontally-oriented turbine extends in a depth-wise direction.

The use of top-entry vertical turbine agitators is known in the art for batch or continuous fluid reactors. For example, U.S. Pat. No. 5,046,856 to McIntire discloses the use of a series of top-entry vertical turbine agitators in a series of tanks wherein at least one of the tanks overflows into another. U.S. Pat. No. 4,566,971 to Reimann et al. teaches the use of a top-entry vertical turbine agitator in a continuous flow-stirred tank. Such top-entry agitators are characterized by mechanicals which are above the liquid level of the associated vessel, and have a vertical shaft extending down into the vessel. However, such "top-entry" vertical turbine agitators have not been used to generate directed, horizontal flow streams.

In reactor vessels or other flow channels which include an aeration system, conventional agitators or mixers must be carefully positioned with respect to the aeration source. For example, horizontal flow losses can be experienced if the mixer or agitator is placed at an upstream position which is close to the aeration source because the aeration source tends to generate a "wall" of gas bubbles. Further, untrue running of the mixer or agitator can occur if the mixer or agitator is placed at a downstream position which is closed to the aeration source due to bubbles being suctioned into the mixer or agitator.

Accordingly, there is a need for a highly efficient fluid mixing system which uses minimal horsepower, provides greater uniformity of velocity profile versus fluid depth and is easily serviced and maintained. There is also a need for a horizontal flow generator which is less sensitive to positioning relative to aeration sources in mixing systems.

SUMMARY OF THE INVENTION

The present invention is a fluid mixing system which includes at least one fluid mixing module and method for generating and maintaining a substantially uniform velocity profile in a fluid circulation system, such as a plug flow reactor, which requires substantially less horsepower than conventional fluid mixing systems without sacrificing mixing efficiency. More particularly, the present invention is a fluid mixing module and method for producing a high velocity mixing regime for large, flat horizontal plug flow reactors which require long fluid detention times.

The fluid mixing module of the present invention employs a top-entry vertically-oriented turbine and a flow generation housing that encloses the turbine impeller and directs fluid pumped by the turbine in a horizontal, downstream direction. The fluid mixing module of the present invention is capable of maintaining high velocities within the plug flow reactor and a relatively constant fluid velocity profile across the reactor's width and depth. Furthermore, a pair of moderately-sized turbine agitators of the present invention generate a sufficient horizontal flow stream to circulate the fluid in a conventionally-sized oxidation ditch or plug flow reactor.

In a preferred embodiment, the top-entry vertical turbine agitator of the present invention includes a drive motor mounted above the reactor fluid level which is a vertically-oriented output shaft that drives an impeller. The housing is shaped to enclose the impeller and includes a partially-open upstream wall, closed side and top walls, and an open downstream side. This housing causes the fluid in the reactor to flow into the housing, where the impeller and housing cooperate to generate a strong downstream fluid flow from the housing sufficient to circulate fluid in a horizontal plug flow reactor or oxidation ditch of conventional size.

The top-entry vertical agitator of the present invention may advantageously be placed in close proximity to an aeration source of a reactor vessel, oxidation ditch or other flow channel. Typically such an aeration source is located at the bottom of the flow channel and releases gas bubbles which flow generally upward. The top-entry vertical agitator may be positioned with the downstream opening of the housing in close proximity to the aeration source such that the horizontal flow exiting the downstream opening passes over the aeration source stripping the gas bubbles from the aeration source before a wall of gas bubbles is formed. Further, the top-entry agitator can be positioned with the upstream side of the housing or nose in close proximity to the aeration source without significant detrimental effect to horizontal flow generation.

Accordingly, it is an object of the present invention to provide a fluid mixing module and method for generating and maintaining a horizontal fluid velocity profile in a reactor vessel; a fluid mixing module that requires relatively low horsepower and energy to mix a plug flow reactor or any large vessel; a fluid mixing module that can be easily serviced in which the drive motor component and mechanicals positioned above the surface of the fluid, thereby eliminating the need for water-tight components; and a fluid mixing module which can be positioned in a flow channel in close proximity to an aeration source.

DETAILED DESCRIPTION

Figure 1:
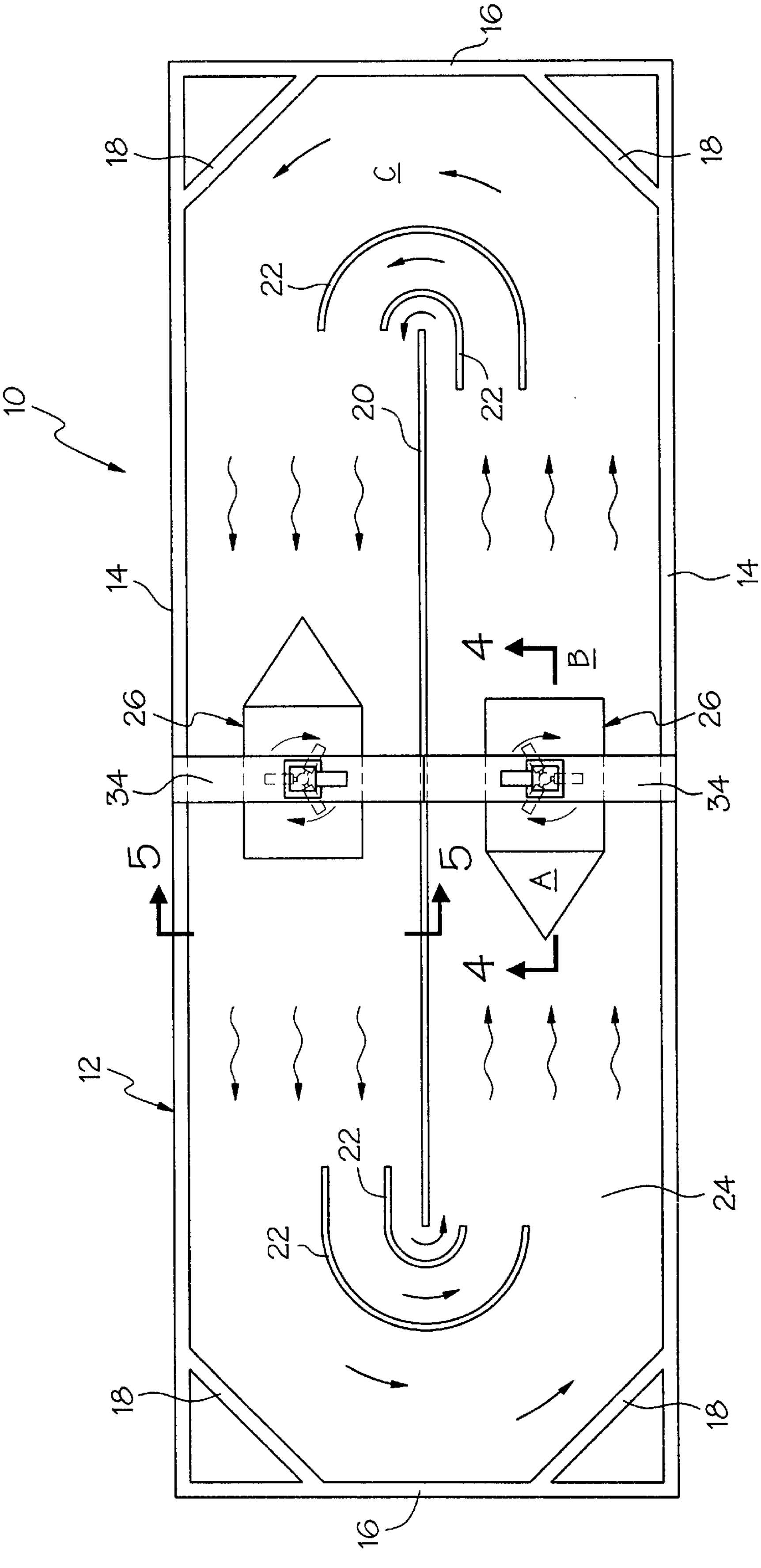
FIG. 1 is a top plan view of a preferred embodiment of a fluid mixing system of the present invention, shown mounted within a plug flow reactor.

The fluid mixing system including fluid mixing modules and method of the present invention is capable of being used generally in any fluid circulation system that requires a directed horizontal fluid flow. As shown in FIG. 1, in accordance with one preferred embodiment of the present invention, a plug flow reactor, generally designated 10, includes a tank 12 having side walls 14, end walls 16 and corner walls 18. A vertically-oriented divider wall 20 and vertically-oriented turning vanes 22 are disposed within the tank 12. The tank 12 is filled with fluid 24, which is typically water with suspended particulates for treatment.

The plug flow reactor 10 further includes a fluid mixing system including two fluid mixing modules 26 which are substantially identical in configuration.

Figure 3:
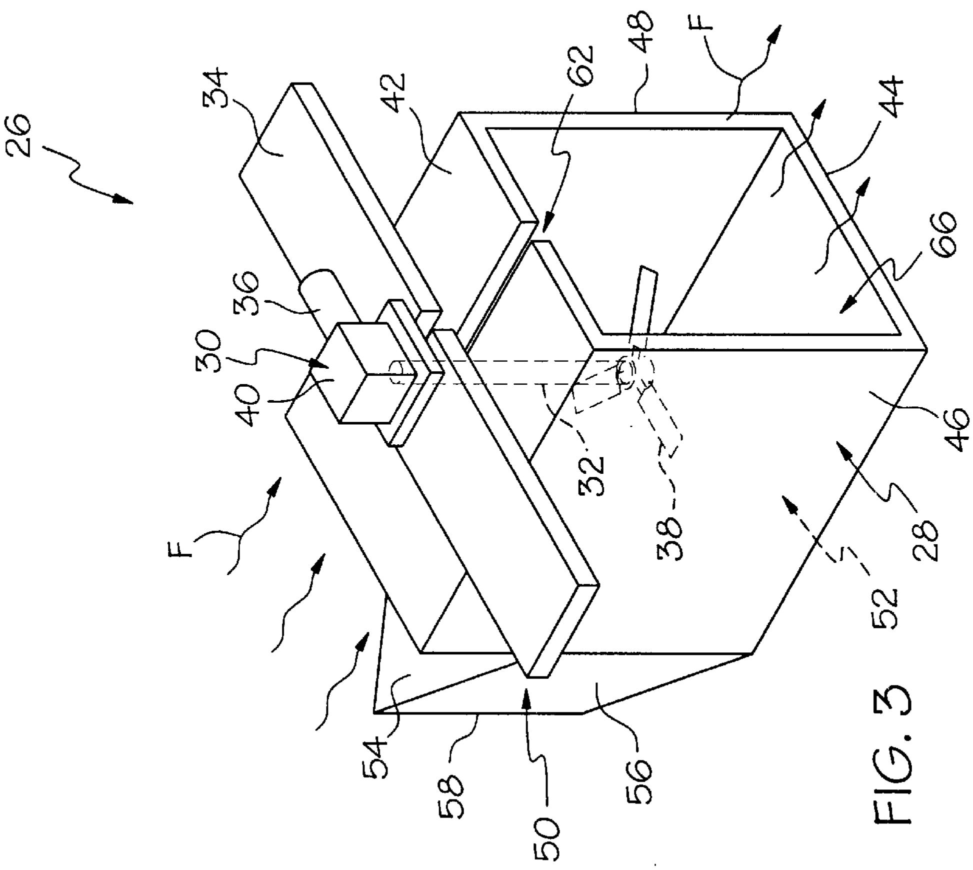
FIG. 3 is a perspective view taken from the downstream side of the fluid mixing module of FIG. 1.
Figure 2:
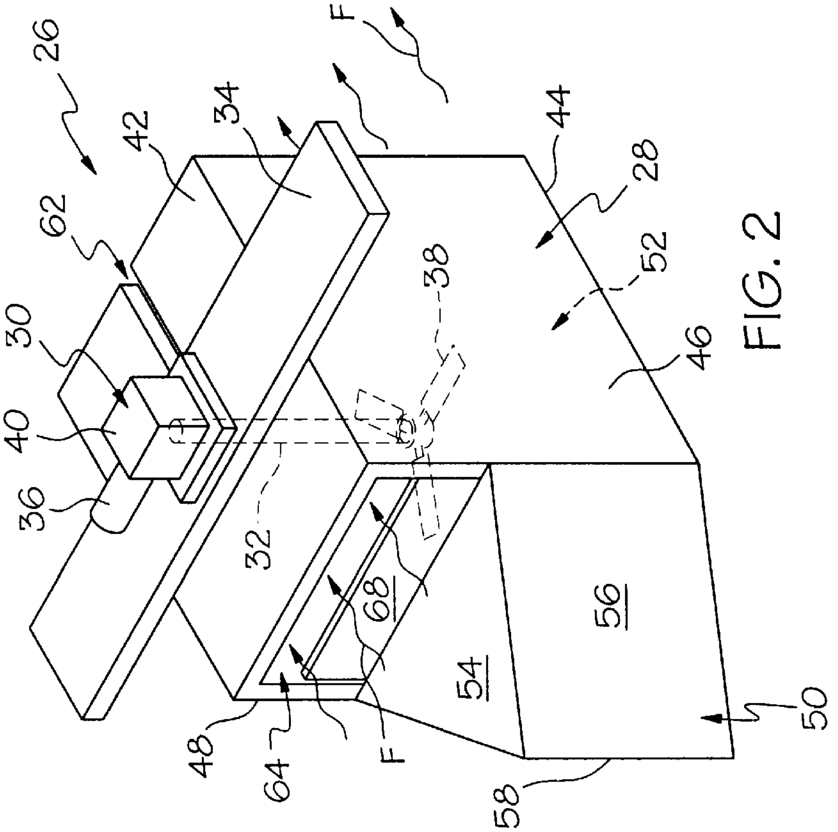
FIG. 2 is a perspective view taken from the upstream side of the fluid mixing module of FIG. 1.

As best shown in FIGS. 2 and 3, each fluid mixing module 26 includes a housing 28, a vertically-oriented turbine agitator, generally designated 30, having a vertically-oriented shaft 32 extending down into the housing 28, and a support 34 for the agitator 30. As shown in FIG. 1, the support 34 spans between a side wall 14 and divider wall 20 of tank 12 to position the fluid mixing module 26 within the tank 12. The support 34 can be made of any suitable material, preferably steel.

The turbine agitator 30 further includes an agitator drive, preferably an electric motor 36, which drives an impeller 38 through the shaft 32. A gear reducer 40 interconnects the motor 36 and shaft 32 in most applications.

The shaft 32 is sized such that the motor 36 and gear reducer 40 are positioned above the surface of the fluid 24. Consequently, such components of the fluid mixing module 26 as the motor 36 and gear reducer 40 can be serviced and maintained easily without withdrawing the agitator 30 from the fluid 24. In addition, because the motor 36 is not submerged, the fluid mixing module 26 is capable of utilizing conventional agitator mixer drive designs which avoids relatively costly sealed bearings, seals, and other waterproof mechanical devices normally located below the fluid surface in submersible mixing modules. One commercially available agitator drive for use with a top-entry vertical turbine agitator is the HT agitator drive manufactured by Chemineer, Inc., Dayton, Ohio.

Preferably, the impeller 38 used with the fluid mixing module 26 of the present invention has an axial flow, three blade hydrofoil contour which produces high thrust with relatively low energy input. More preferably, the impeller 38 has a bent blade design. Commercially available impellers 38 are the HE-3 high efficiency impeller and the P-4 Impeller, both manufactured by Chemineer, Inc., Dayton, Ohio. Of course, the use of other impeller designs is within the scope of the present invention.

The housing 28 includes a substantially horizontal top wall 42, a bottom wall 44, a pair of substantially vertical, opposing side walls 46, 48 and a front nose portion, generally designated 50. The walls 42–48 together define an interior 52, which is sized to receive the impeller 38. The nose 50 includes an upper wall 54, forward walls 56, 58 and a rearward wall 60 (see FIGS. 4 and 5) which meet to form a triangular prism pointing in an upstream direction. The nose 50 may also take other configurations which, like the illustrated configuration, have a side-to-side width which generally decreases from the downstream end of the nose to the upstream end of the nose. For example, the nose 50 may be cone shaped, the nose 50 may include curved forward walls and a curved or slanted upper wall rather than straight forward walls and a straight and horizontal upper wall, or the nose may be formed from more than four walls. The top wall 42 includes a slot 62 sized to receive the shaft 32. The side walls 46, 48 are substantially closed. It should be noted that the bottom wall 44 generally is not needed because the housing 28 preferably rests on the floor 63 of the tank 12 (see FIG. 4).

The nose 50 is sized relative to the side walls 46, 48 to form an upstream opening 64. The housing 28 forms a downstream opening 66, so that fluid 24 flows into and out of the interior 52 of the housing 28 as represented by the flow arrows F through openings 64 and 66.

The fluid flow is directed vertically downwardly by the impeller 38. The flow is redirected to a horizontal direction by the bottom wall 44 and that horizontal flow is forced through the downstream opening 66 as the walls 46, 48 and 60 prevent flow in the remaining directions. In the embodiment shown in FIGS. 2–5, it is important that the upstream opening 64 be positioned above the impeller 38, so that flow is drawn through the upstream opening 64 to feed or supply the impeller 38 with a major component of the required volume of fluid needed to generate optimal downstream fluid flow from the housing 28, and at the same time enhancing the upstream flow of fluid.

The housing 28 is sized relative to the tanks such that a portion of the fluid not entering the housing 28 is directed by the nose portion 50 sidewardly around the housing 28. The flow of such fluid around the housing 28 conserves energy by maintaining the residual flow through the plug flow reactor 10. By using the fluid mixing modules 26 of the present invention, no significant back flow is detected around the outside of the housing 28 sidewardly to the front of the housing 28. In fact, the fluid that flows around the housing 28 mixes with the fluid exiting the housing 28 substantially at or downstream of the downstream opening 66.

The nose portion 50 can be made from any suitable material, such as steel, plastic or preferably, concrete. It is not necessary to make the material used for the nose portion 50 watertight. The nose portion 50 is sized such that the upper wall 54 guides fluid 24 into the interior 52 of the housing 28 through the upstream opening 64.

Even though it is desirable to have at least two fluid mixing modules 26 in the plug flow reactor 10, a single fluid mixing module 26 is generally capable of creating and maintaining a sufficient horizontal flow necessary to maintain the fluid velocity in the plug flow reactor 10.

Figure 4:
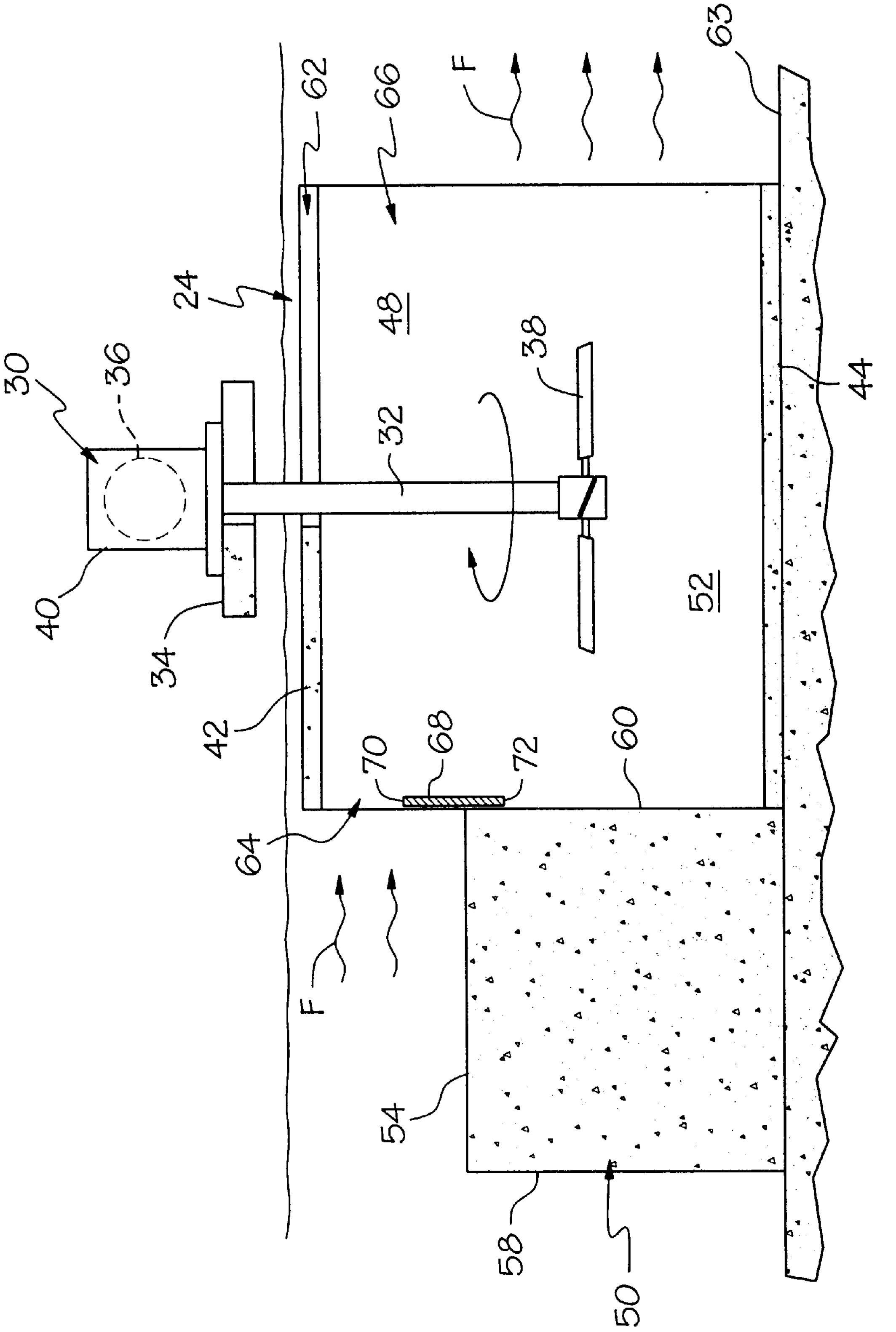
FIG. 4 is a side elevational view in section of the fluid mixing module of the present invention taken at line 4—4 of FIG. 1.

The upstream opening 64 in the housing 28 includes a weir 68 which controls the flow of fluid 24 into the housing 28. The weir 68 includes upper and lower edges or surfaces 70, 72, as best shown in FIG. 4. Fluid 24 flows over the upper edge 70 of the weir 68 when entering the housing 28 through the upstream opening 64. Preferably, the weir 68 is adjustable in elevation by design or mechanism to open or close the upstream opening 64 to adjust and optimize the horizontal flow stream created by the fluid mixing module 26 in the fluid 24.

Figure 5:
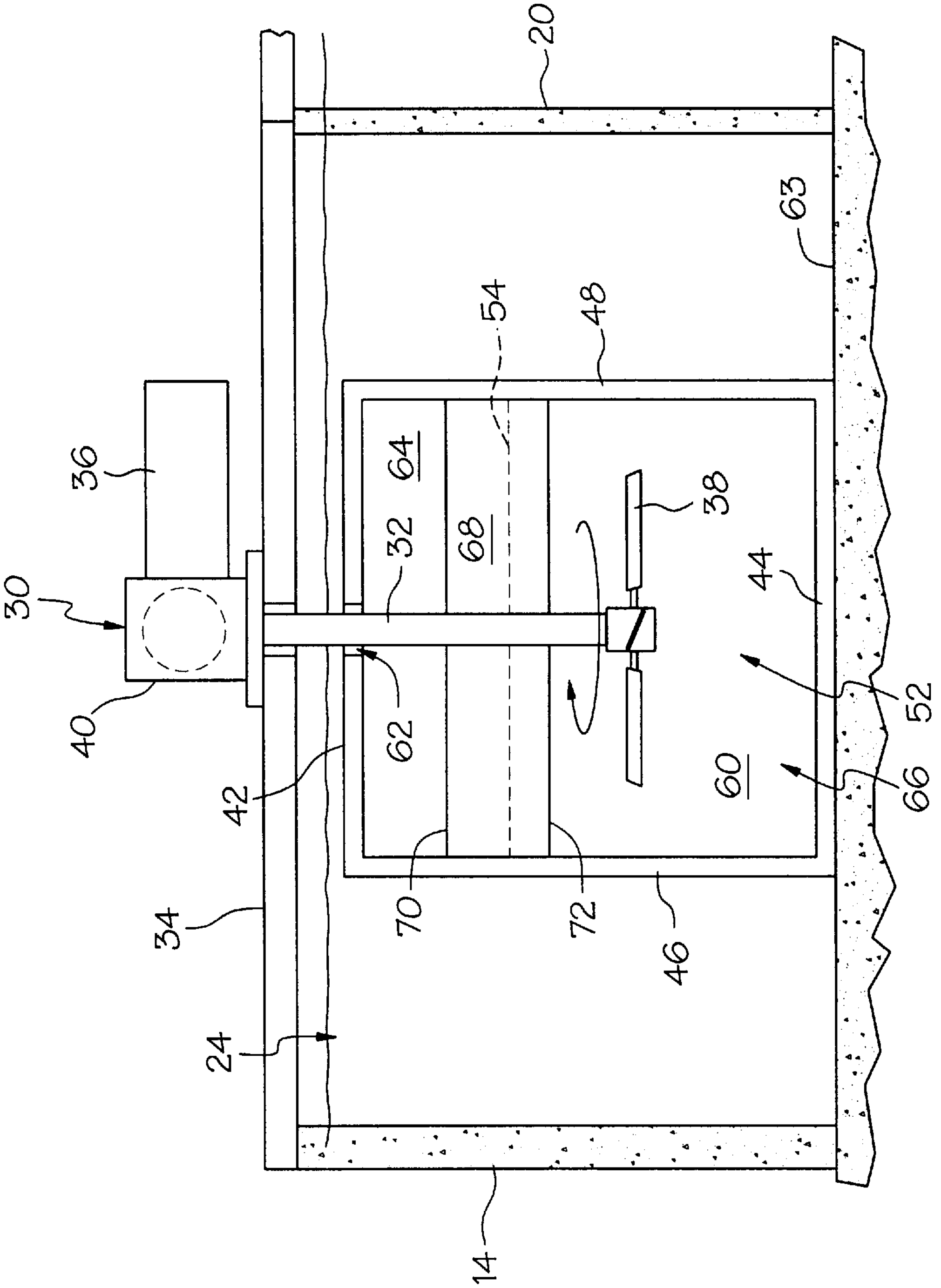
FIG. 5 is a downstream end elevational view in section of the fluid mixing module of the present invention taken at line 5—5 of FIG. 1.

The downstream opening 66 of the housing 28 encompasses substantially the entire area between the top wall 42 and bottom wall 44 (or floor 63) of the housing 28, such that the fluid 24 can exit the housing 28 and propel fluid across the entire depth of the fluid in the reactor 10, as best shown in FIGS. 3, 4 and 5.

The operation of the system and fluid mixing module 26, as best shown in FIG. 1, is as follows. A tank 12 of a plug flow reactor 10 or oxidation ditch is filled with a fluid 24 for the purpose of treating particulate material suspended in the fluid 24. The fluid 24 also contains active biological components, such as varieties of bacteria, which break down the particulate organic material. At least one and preferably two fluid mixing modules 26 are placed into the tank 12, on opposite sides of the divider wall 20 in a relatively straight segment of the tank 12, and oriented to direct the fluid 24 in a common direction (counterclockwise as shown in FIG. 1). The modules 26 are actuated and the impellers 38 direct the fluid 24 in the housings 28 downwardly within the interiors 52 of the housings 28, thus downpumping the fluid 24 from the impellers 38 such that the upstream openings 64 are above the downpumping. The shapes of the housings 28 direct the fluid 24 out the downstream openings 66.

Figure 6:
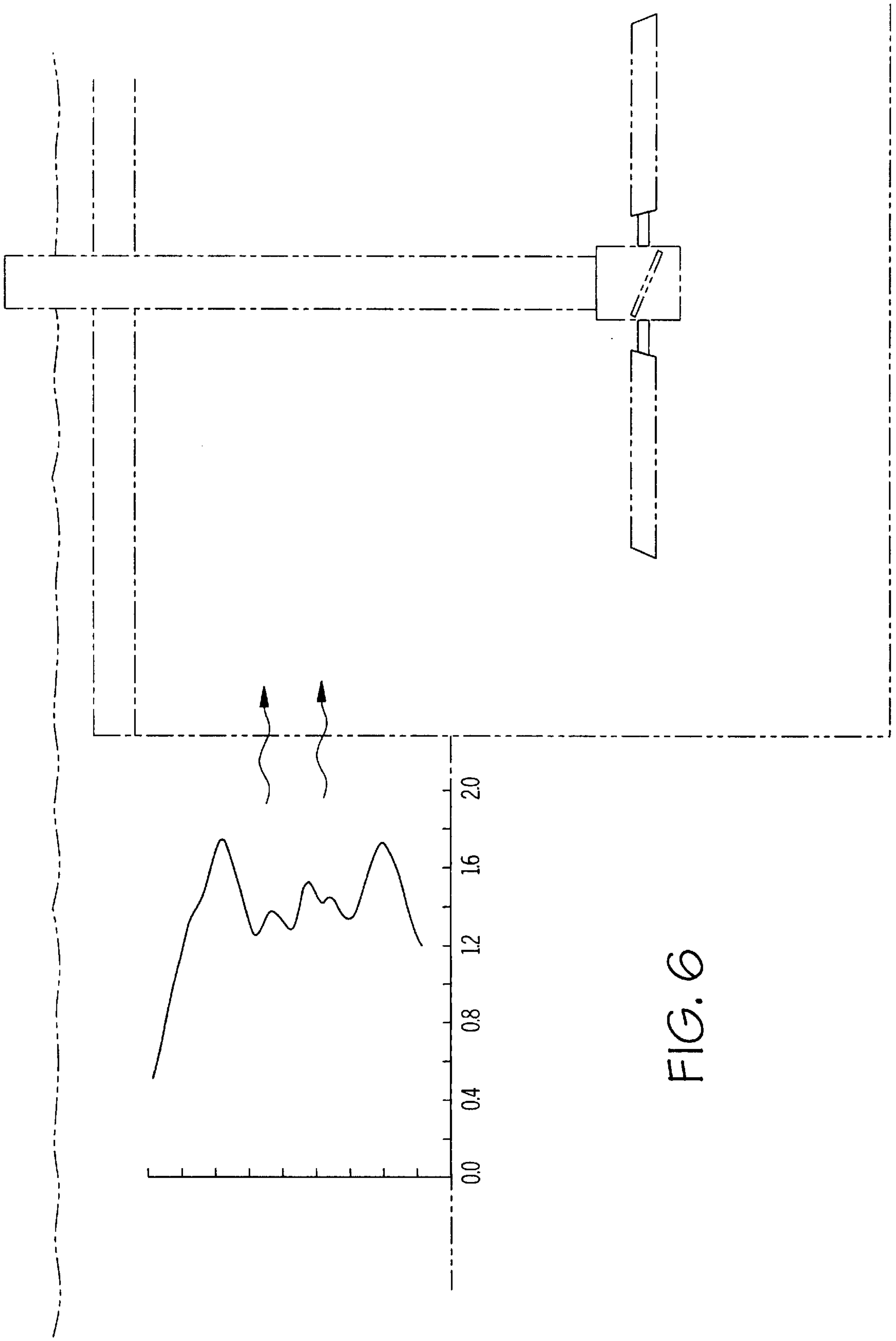
FIG. 6 is a laboratory scale velocity plot of the fluid in a plug flow reactor utilizing the system of FIG. 1 taken at location A of FIG. 1.

The fluid 24 exiting the modules 26 is replaced by fluid 24 entering the upstream openings 64 of the modules 26. As a result of the design of the housings 28, the fluid flow from the housing 28 is substantially horizontal. For example, in FIG. 6 a laboratory scale velocity plot is taken at point A in FIG. 1, which is immediately upstream of the upstream opening 64 of one of the modules 26.

Figure 7:
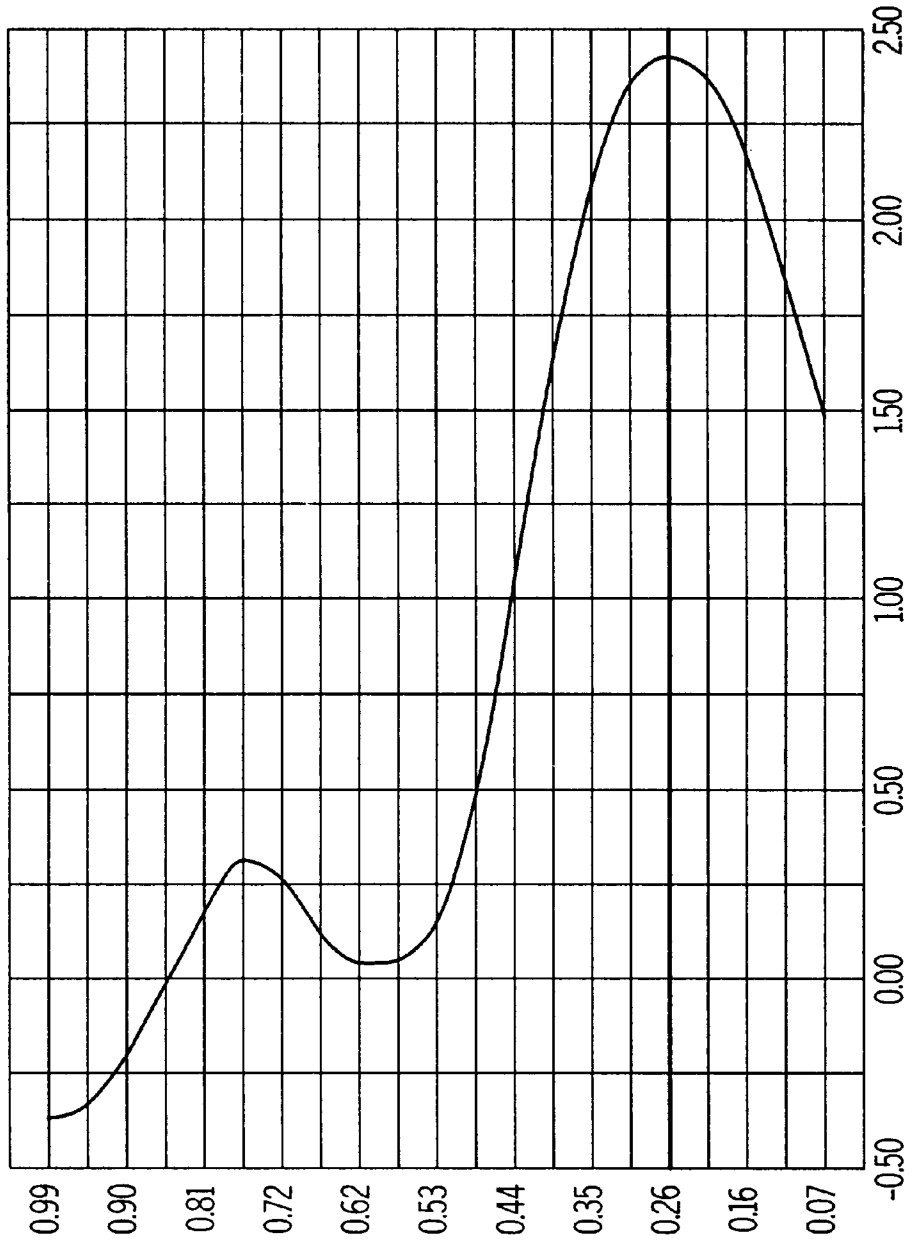
FIG. 7 is a laboratory scale velocity plot of the fluid in a plug flow reactor utilizing the system of FIG. 1 taken at location B of FIG. 1.

The horizontal fluid flow exiting the housing 28 through the downstream opening 66 has the greatest velocity near the bottom wall 44 of the housing 28 as shown in FIG. 7, representing a laboratory scale velocity plot taken just outside the downstream opening 66 of the housing 28 at point B in FIG. 1. In FIG. 7, the elevation of the impeller 38 is represented by the heavy line.

Figure 8:
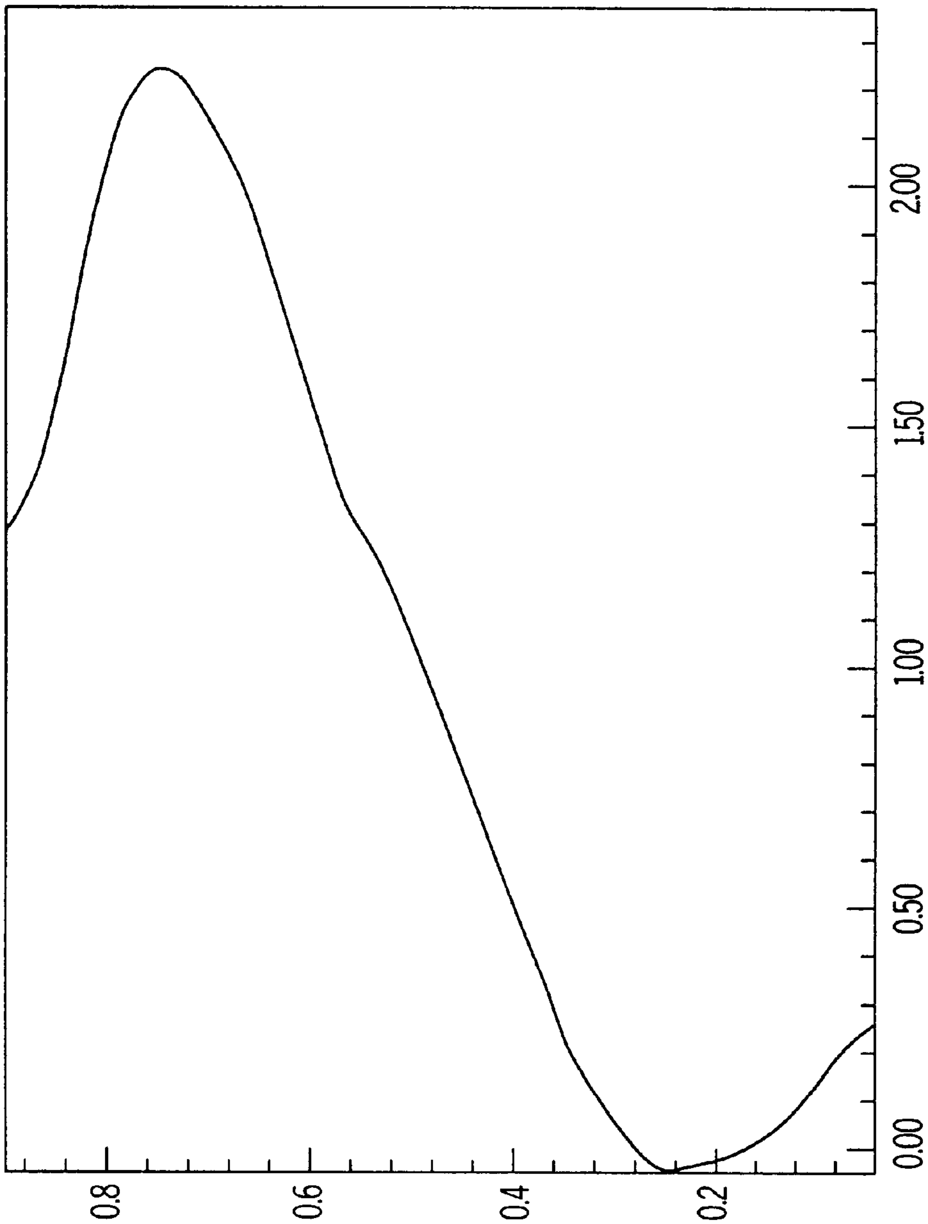
FIG. 8 is a laboratory scale velocity plot of the fluid in a plug flow reactor utilizing the system of FIG. 1 taken at point C of FIG. 1.

As shown in FIG. 8, representing a laboratory scale velocity plot taken at point C in FIG. 1, the velocity of the horizontal flow is greatest near the surface of the fluid.

FIGS. 7 and 8 establish that a significant top to bottom to top flow pattern is created by using the fluid mixing modules 26 of the present invention. This mixing pattern provides significantly better mixing than known mixing technologies utilized for horizontal plug flow reactors or the like.

The fluid mixing system of the present invention provides the ability to mix much deeper plug flow reactor 10 channels or basins than conventional fluid mixing systems allow. It is believed that the unique discharge path from the top-entry vertical turbine agitator 30 is a key factor in creating this ability to mix much deeper channels or basins. As a result, a reactor of a given size can handle a greater volume of particulate materials with the invention.

Figure 10:
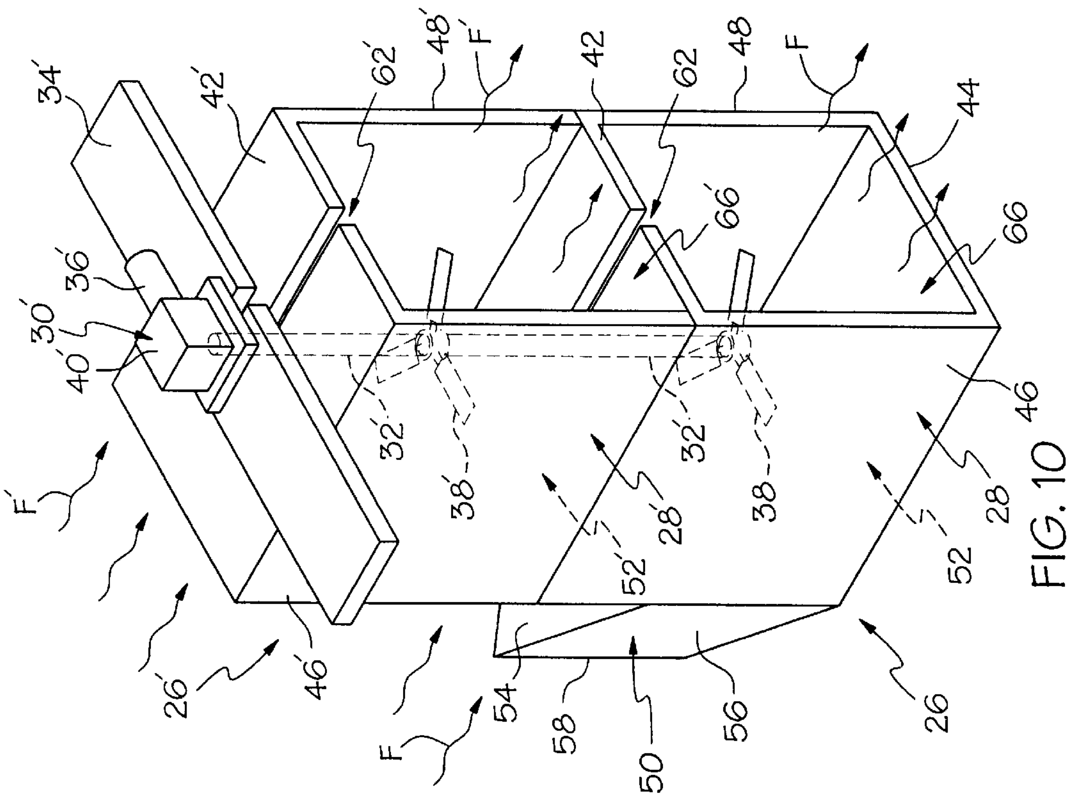
FIG. 10 is a perspective view taken from the downstream side of the fluid mixing module of FIG. 9.
Figure 9:
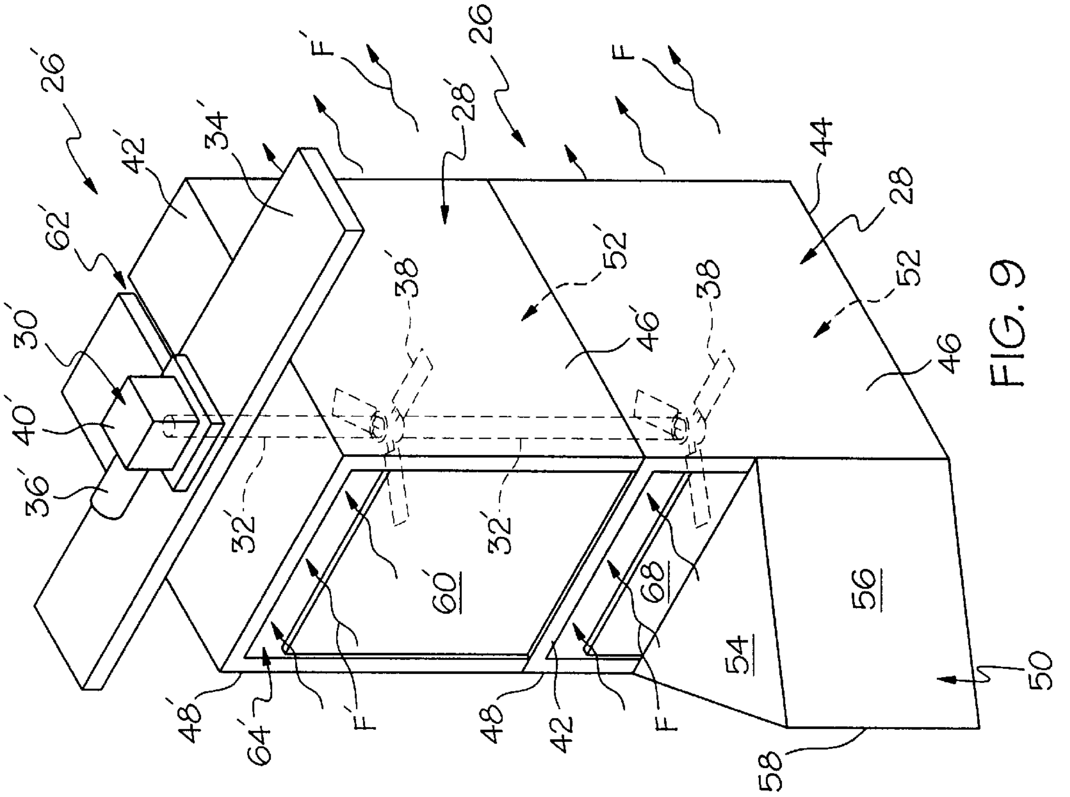
FIG. 9 is a perspective view taken from the upstream side of a second preferred embodiment of a fluid mixing module of the present invention, in which flow generation modules are in a stacked configuration.

When desirable, for example when the depth of the fluid 24 within the plug flow reactor 10, is relatively large, then two or more fluid mixing modules, a lower unit 26 and an upper unit 26', may be stacked in a vertical column, as shown in FIGS. 9 and 10. In such an embodiment, a single top-entry vertical turbine shaft 32' extends through the housings 28, 28'. Each housing 28, 28' substantially encloses a respective impeller 38, 38'. In the stacked module embodiment, it is preferable that only the housing 28 of the bottom unit 26 include a nose 50 and that the top wall 42 of the housing 28 of the bottom unit 26 acts as the bottom wall of the housing 28' of the top unit 26'.

Figure 12:
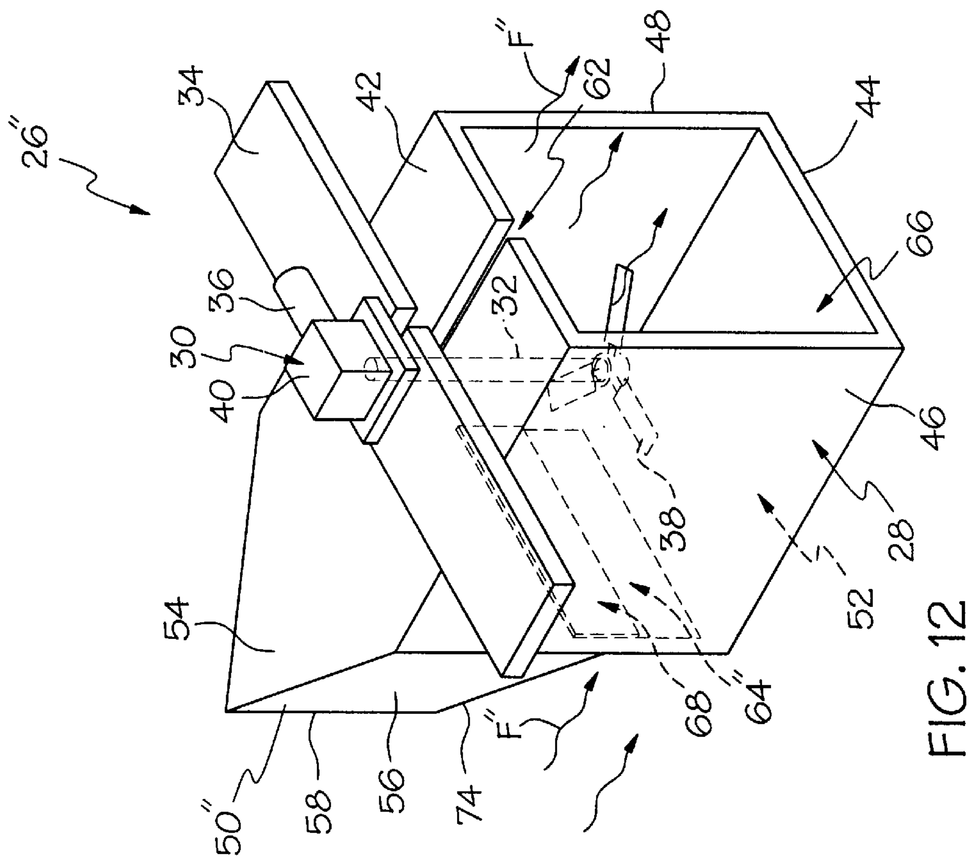
FIG. 12 is a perspective view taken from the downstream side of the fluid mixing module of FIG. 11.
Figure 11:
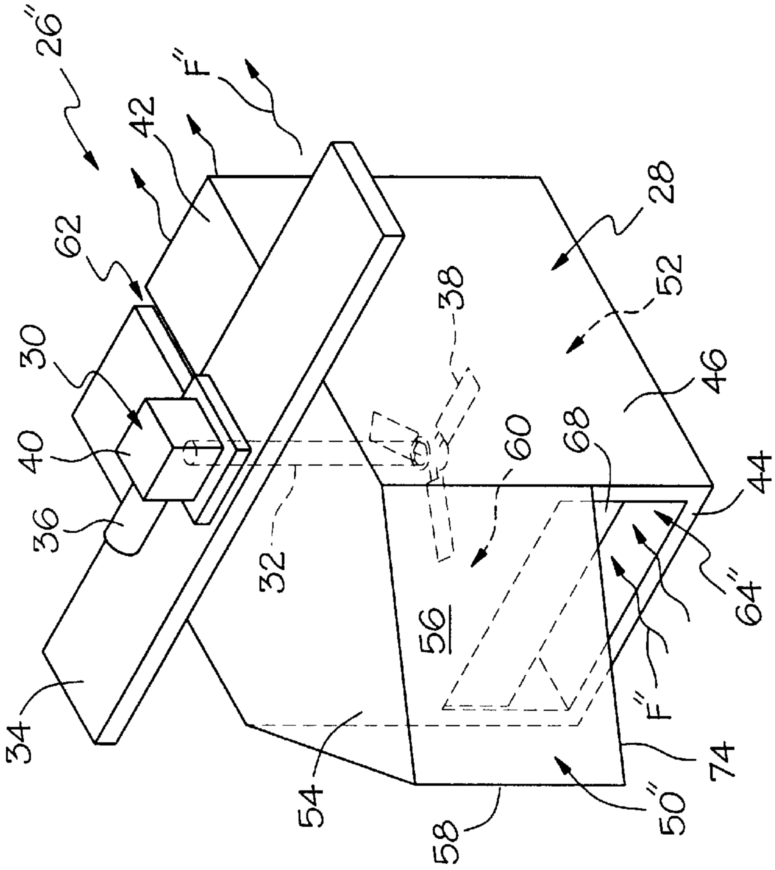
FIG. 11 is a perspective view taken from the upstream side of an alternate embodiment of a fluid mixing module of the present invention.

As shown in FIGS. 11 and 12, in an another alternate embodiment of the invention, the nose 50" is sized relative to the side walls 46, 48 of the housing 28 to form an upstream opening 64", so that fluid 24 flows into and out of the interior 52 of the housing 28 as represented by the flow arrows F" through openings 64" and 66. Preferably, the nose 50" is substantially identical in configuration to nose 50, as shown in FIGS. 1–5, with the addition of a lower wall 74.

The fluid flow is directed vertically upwardly by the impeller 38. The flow is redirected to a horizontal direction by the top wall 42 and that horizontal flow is forced through the downstream opening 66 as the walls 46, 48 and 60 prevent flow in the remaining directions. In the embodiment shown in FIGS. 11 and 12, it is important that the upstream opening 64" be positioned below the impeller 38, so that flow is drawn through the upstream opening 64" to feed or supply the impeller 38 with a major component of the required volume of fluid needed to generate optimal downstream fluid flow from the housing 28, and at the same time enhancing the upstream flow of fluid.

To achieve the best results, the upstream openings 64, 64' and 64" must be upstream of the fluid discharge from the impellers 38 or 38'.

The fluid mixing system of the present invention creates a velocity profile in the fluid with respect to the depth of the plug flow reactor that is substantially uniform. The fluid mixing system of the present invention utilizes torque rather than horsepower to generate fluid velocity. As a result, plug flow reactors using the fluid mixing system of the present invention can be effectively mixed with about one-tenth the amount of horsepower required for submersible mixing systems, such as submersible agitators, to mix a similar plug flow reactor. Positioning turning vanes 22 or the like within the tank 12 of a plug flow reactor 10 in the curves of the tank 12, as shown in FIG. 1 is desirable to assist in maintaining high velocities within the reactor and a relatively uniform velocity profile in the fluid across the reactor's width and throughout its depth.

Figure 13:
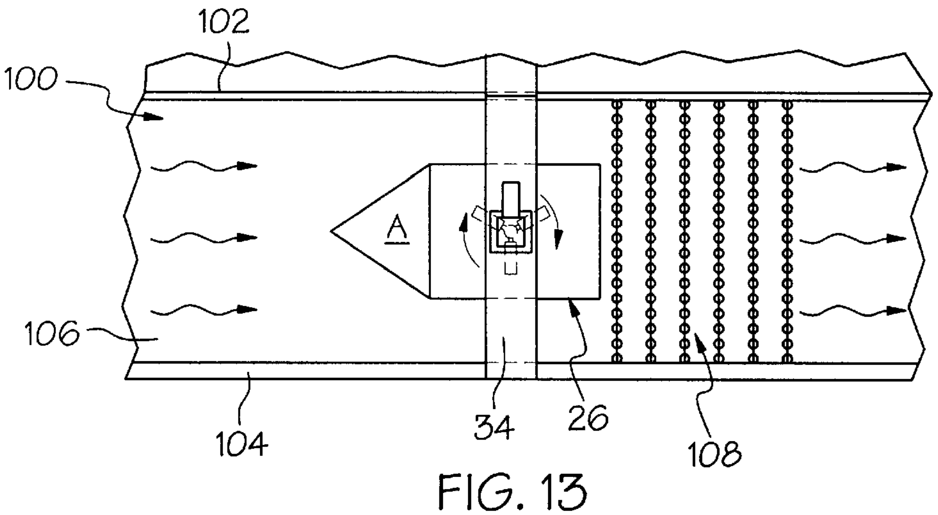
FIG. 13 is a top plan view of a flow channel including a fluid mixing module of the present invention positioned upstream of an aeration source.
Figure 14:
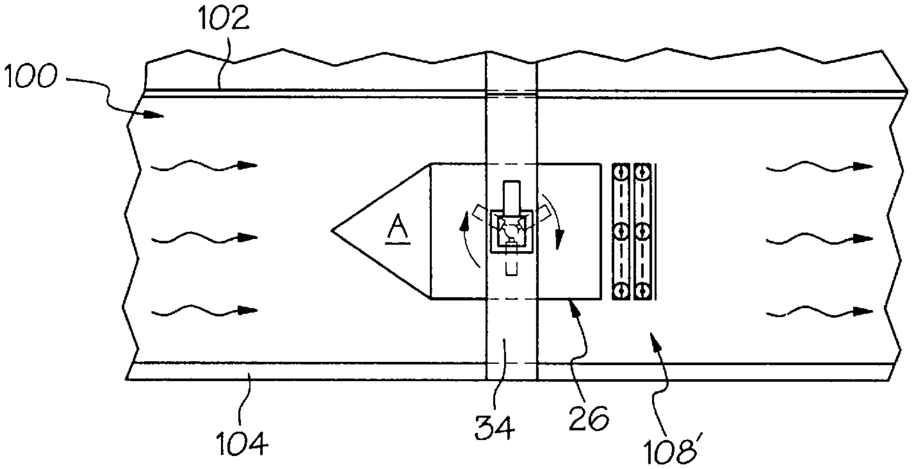
FIG. 14 is a top plan view of a flow channel including a fluid mixing module of the present invention positioned upstream of an alternative aeration source.

The mounting of an aeration source in the bottom of the tank of the plug flow reactor or other flow channel immediately downstream of the fluid mixing module will increase oxygenation in the fluid which gets depleted as it flows throughout the plug flow reactor or oxidation ditch. This is accomplished because the increase in fluid flow increases the shearing effect on the gas bubbles generated from the grid of the aerator. For example, reference is made to FIGS. 13 and 14 which show a three-sided flow channel 100 formed by side walls 102, 104 and bottom wall 106. A fluid mixing module 26 is positioned along flow channel 100 to aid horizontal fluid flow generally indicated by the arrows. In FIG. 13 an aeration source 108 is positioned at the downstream side of mixing module 26 in close proximity to the downstream opening of the mixing module 26. In FIG. 14 an aeration source 108' is likewise positioned at the downstream side of mixing module 26 in close proximity to the downstream opening of the mixing module 26. Aeration source 108 may be, for example, a plurality of fine bubble diffusers or membrane diffusers while aeration source 108' is more representative of a manifold type aeration source. Other types of porous and non-porous diffusers could likewise be utilized as aeration sources in conjunction with the mixing module of the present invention. Although use of aeration sources is generally known, placement of such aeration sources in close proximity to the downstream side of horizontal flow generating devices has previously been avoided. Advantageously, the mixing module 26 generates a large enough horizontal fluid flow that shearing forces effectively strip gaseous bubbles from the aeration source 108, 108' such that the gaseous bubbles are immediately mixed with the liquid flow stream rather than rising up to form a bubble "wall" as has commonly occurred in the past. In order to achieve this desired bubble stripping effect it is preferred that the horizontal distance between the downstream opening of the mixing module 26 and the upstream side or edge of the aeration source 108, 108' be within a range of from about ¼ to about ½ the diameter of the impeller of the mixing module 26. For example, in a mixing module including an eighty inch diameter impeller the preferred range would be from about twenty inches to about forty inches. As used herein, the downstream opening of the mixing module 26 is considered to be in close proximity to the aeration source 108, 108' if the horizontal distance between the downstream opening of the mixing module and the upstream side or edge of the aeration source is within about ½ the diameter of the impeller of the mixing module or closer.

Figure 15:
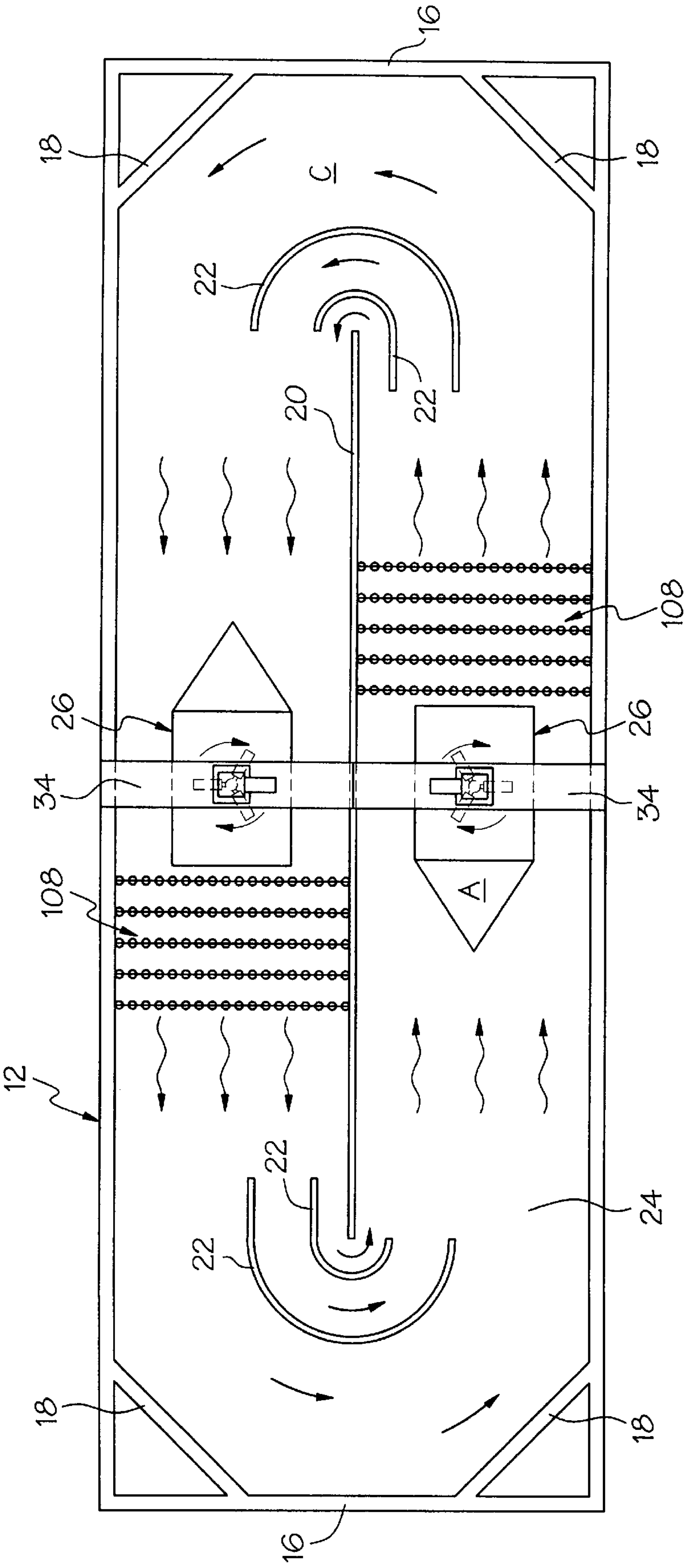
FIG. 15 is a top plan view of reactor vessel including fluid mixing modules positioned upstream of respective aeration sources.

The bubble stripping effect is enhanced because the mixing module of the present invention not only provides a high horizontal flow rate but also provides such high flow rate near the bottom of the flow channel 100. Accordingly, it is preferred to use a mixing module embodiment of the types shown in FIGS. 2 and 3 or 9 and 10, although the embodiment shown in FIGS. 11 and 12 could also be used in conjunction with aeration sources. Referring to FIG. 15, it is noted that the mixing module may be used in conjunction with the plug flow reactor 10 of FIG. 1 where multiple aeration sources 108 are positioned downstream of the mixing modules 26.

Figure 16:
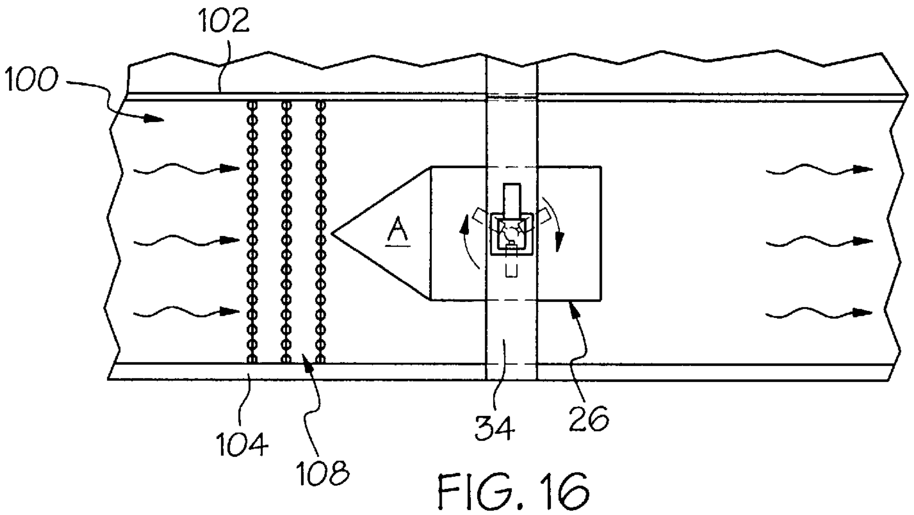
FIG. 16 is a top plan view of a flow channel including a fluid mixing module of the present invention positioned downstream of an aeration source.

Advantageously, the mixing module of the present invention may also be positioned immediately downstream of the aeration source as shown in FIG. 16. In such cases due to the high flow created around the mixing module housing aeration bubbles will tend to flow around the housing to mix with the high horizontal flow exiting the downstream opening of the mixing module 26. Other aeration bubbles may be pulled into the upstream opening and pass by the impeller of the mixing module. In such systems the aeration source 108, 108' may be placed immediately in front of the nose of the mixing module 26 and might also extend partially along the sides of the mixing module 26. Further, a fine bubble aeration source may even be placed immediately in front of the upstream opening of the mixing module housing so that substantially all of the gas bubbles pass by the impeller of the mixing module. In such a system, the fine bubble aeration source could be placed on, adjacent, or integrated with the upper wall or surface of the nose portion of the mixing module in mixing module embodiments where the upstream opening is above the nose portion of the housing, or the fine bubble aeration source could be placed along the bottom surface of the flow channel directly in front of the upstream opening in mixing module embodiments where the upstream opening is positioned below the nose portion of the housing. The high flow capabilities of the mixing module of the present invention allow it to work effectively even when the gas bubbles are directed into the upstream opening of the housing. This represents a substantial distinction and improvement over conventional systems incorporating aeration.

Although use of the mixing module 26 of the present invention has been described in a preferred form as being inclose proximity to the aeration source 108, 108', it is recognized that the mixing module 26 could likewise be placed further from the aeration source 108, 108'.

By way of example, a comparison of the fluid mixing module of the present invention and a conventional fluid mixing apparatus is provided. In a plug flow reactor tank having a depth of 20 feet and a chamber width of 40 feet, the fluid mixing module of the present invention can employ an impeller having a diameter as large as 12 feet which in operation typically rotates at 30 to 37 rpm or less to effectively drive the plug flow reactor. In the same plug flow reactor tank, a conventional horizontally-oriented turbine agitator can only use an impeller having a diameter in the range of about 30 inches to about 87 inches which in operation typically rotates at about 150 rpm or above to effectively drive the plug flow reactor. The energy conservation evidenced by the use of the fluid mixing module of the present invention is substantial.

Preferably, the housing 28 is made from a suitable material such as concrete, stainless steel, coated steel, rust-resistant steel or combinations thereof. Those skilled in the art will appreciate that other suitable materials are not outside the scope of the present invention.

Having described the invention in detail and by reference to the drawings, it will be apparent that modifications and variations are possible without departing from the scope of the invention as defined in the following claims.

What is claimed is:

1. A horizontal flow generation system comprising:

a liquid containing channel;

a drive motor having a substantially vertically-oriented, rotatable output shaft extending downward into said liquid containing channel;

an impeller mounted on said output shaft within the liquid containing channel;

a housing enclosing said impeller and having an upstream and a downstream opening for entrance and egress, respectively, of liquid, wherein rotation of said impeller causes liquid to enter said housing through said upstream opening substantially perpendicular to said output shaft and be propelled through said downstream opening substantially perpendicular to said output shaft; and an aeration source positioned along a bottom of said liquid containing channel, wherein a horizontal distance between said downstream opening of said housing and an upstream side of said aeration source is within about ½ of a diameter of said impeller.

2. The horizontal flow generation system of claim 1 wherein a horizontal distance between said downstream opening of said housing and an upstream side of said aeration source is within a range of about ¼ to ½ of a diameter of said impeller.

3. The horizontal flow generation system of claim 1 wherein said housing includes a nose portion positioned below said upstream opening of said housing, said nose portion having a side-to-side width that generally decreases from a downstream end of said nose portion to an upstream end of said nose portion.

4. The horizontal flow generation system of claim 1 wherein said flow channel comprises part of a tank which includes outer walls and a central partition.

5. The horizontal flow generation system of claim 1 wherein said aeration source is positioned downstream of said downstream opening of said housing.

6. The horizontal flow generation system of claim 5 wherein said downstream opening of said housing is positioned in close proximity to said aeration source.

7. The horizontal flow generation system of claim 6 wherein said downstream opening of said housing and an upstream side of said aeration source is within a range of about ¼ to ½ of a diameter of said impeller.

8. A horizontal flow generation system comprising:

a liquid containing channel;

a drive motor having a substantially vertically-oriented, rotatable output shaft extending downward into said liquid containing channel;

an impeller mounted on said output shaft within the liquid containing channel;

a housing enclosing said impeller and having an upstream and a downstream opening for entrance and egress, respectively, of liquid, wherein rotation of said impeller causes liquid to enter said housing through said upstream opening substantially perpendicular to said output shaft and be propelled through said downstream opening substantially perpendicular to said output shaft, wherein one of said upstream opening and said downstream opening is positioned above said impeller and the other of said upstream opening and said downstream opening is positioned below said impeller, an interior of said housing being substantially open between said upstream opening and said downstream opening;

an aeration source positioned within said liquid containing channel; and wherein said housing includes a nose portion positioned alongside said upstream opening of said housing, said nose portion having a side-to-side width that generally decreases from a downstream end of said nose portion to an upstream end of said nose portion.

9. The horizontal flow generation system of claim 8 wherein said flow channel comprises part of a tank which includes outer walls and a central partition.

10. The horizontal flow generation device of claim 8 wherein liquid enters through said upstream opening of said housing in a plane substantially perpendicular to said outputs shaft and liquid is propelled through said downstream opening in a plane substantially perpendicular to said output shaft.

11. The horizontal flow generation device of claim 8 wherein said aeration source is located upstream of said upstream opening of said housing.

12. The horizontal flow generation device of claim 11 wherein said upstream opening of said housing is positioned above said nose portion and said aeration source is positioned above said nose portion.

13. A horizontal flow generation system comprising:

a liquid containing channel;

a drive motor having a substantially vertically-oriented, rotatable output shaft extending downward into said liquid containing channel;

an impeller mounted on said output shaft within the liquid containing channel;

a housing enclosing said impeller and having an upstream and a downstream opening for entrance and egress, respectively, of liquid, wherein rotation of said impeller causes liquid to enter said housing through said upstream opening and be propelled through said downstream opening;

an aeration source positioned within said liquid containing channel; and wherein said housing includes a nose portion positioned alongside said upstream opening of said housing, said nose portion having a side-to-side width that generally decreases from a downstream end of said nose portion to an upstream end of said nose portion;

wherein said aeration source is located upstream of said upstream opening of said housing; and wherein said upstream opening of said housing is positioned above said nose portion and said aeration source is positioned above said nose portion.

14. A liquid mixing assembly for generating horizontal flow when submerged in a liquid containing channel, comprising:

a drive motor having a substantially vertically-oriented, rotatable output shaft;

a first impeller mounted on said output shaft;

a housing enclosing said impeller and having an upstream and a downstream opening for entrance and egress, respectively, of liquid, wherein rotation of said impeller causes liquid to enter said housing through said upstream opening in a plane substantially perpendicular to said output shaft and be propelled through said downstream opening in a plane substantially perpendicular to said output shaft, wherein one of said upstream opening and said downstream opening is positioned above said impeller and the other of said upstream opening and said downstream opening is positioned below said impeller, an interior of said housing being substantially open between said upstream opening and said downstream opening; and wherein said housing includes a nose portion positioned alongside said upstream opening of said housing, said nose portion having a side-to-side width that generally decreases from a downstream end of said nose portion to an upstream end of said nose portion.

15. The liquid mixing assembly of claim 14 further comprising an aeration source positioned such that egress flow from said housing comprises an aerated liquid.

* * * * *